US008722820B2

(12) United States Patent
Apecetche et al.

(10) Patent No.: US 8,722,820 B2
(45) Date of Patent: May 13, 2014

(54) METHODS FOR REDUCING STATIC CHARGE OF A CATALYST AND METHODS FOR USING THE CATALYST TO PRODUCE POLYOLEFINS

(75) Inventors: Maria A. Apecetche, Buenos Aires (AR); Maria Pollard, Pearland, TX (US); Robert O. Hagerty, Wyckoff, NJ (US); Michael D. Awe, Langhorne, PA (US); Kevin J. Cann, Rocky Hill, NJ (US); Jose F. Cevallos-Candau, Charleston, WV (US); F. David Hussein, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/512,943

(22) PCT Filed: Dec. 7, 2010

(86) PCT No.: PCT/US2010/059256
§ 371 (c)(1),
(2), (4) Date: Dec. 19, 2012

(87) PCT Pub. No.: WO2011/071900
PCT Pub. Date: Jun. 16, 2011

(65) Prior Publication Data
US 2013/0085245 A1    Apr. 4, 2013

Related U.S. Application Data

(60) Provisional application No. 61/267,208, filed on Dec. 7, 2009.

(51) Int. Cl.
*C08F 4/06* (2006.01)
*C08F 2/00* (2006.01)
*B01J 31/00* (2006.01)

(52) U.S. Cl.
USPC .............................. 526/130; 526/88; 502/152

(58) Field of Classification Search
None
See application file for complete search history.

(56) References Cited

U.S. PATENT DOCUMENTS

| 5,834,571 | A | 11/1998 | Bernier et al. |
| 6,894,131 | B2 * | 5/2005 | McCullough et al. ........ 526/160 |
| 2001/0020072 | A1 * | 9/2001 | Agapiou et al. ................ 526/68 |
| 2002/0103072 | A1 | 8/2002 | Patrick et al. |
| 2003/0199390 | A1 | 10/2003 | Chang |
| 2009/0018279 | A1 | 1/2009 | Hagerty et al. |

FOREIGN PATENT DOCUMENTS

| WO | 2008016478 A2 | 2/2008 |
| WO | 2009023111 A1 | 2/2009 |

* cited by examiner

*Primary Examiner* — Ling Choi
*Assistant Examiner* — Catherine S Branch

(57) ABSTRACT

Catalysts and methods for making and using the same are provided. The method for fabricating a catalyst may includes contacting a supported catalyst with a monomer under conditions that reduce an overall charge of the catalyst to less than about 75% of an initial charge of the catalyst. A method for polymerization may include introducing a pre-polymerized catalyst and one or more olefins into a gas phase fluidized bed reactor, operating the reactor at conditions sufficient to produce a polyolefin, wherein the polymerization is carried out in the substantial absence of any continuity additives.

12 Claims, 2 Drawing Sheets

METHODS FOR REDUCING STATIC CHARGE OF A CATALYST AND METHODS FOR USING THE CATALYST TO PRODUCE POLYOLEFINS

BACKGROUND

In the gas phase process for production of polyolefins such as polyethylene, a gaseous alkene (e.g., ethylene), hydrogen, co-monomer and other raw materials are converted to solid polyolefin product. Generally, gas phase reactors include a fluidized bed reactor, a compressor, and a cooler (heat exchanger). The reaction is maintained in a two-phase fluidized bed of granular polyethylene and gaseous reactants by the fluidizing gas which is passed through a distributor plate near the bottom of the reactor vessel. Catalyst is injected into the fluidized bed. Heat of reaction is transferred to the circulating gas stream. This gas stream is compressed and cooled in the external recycle line and then is reintroduced into the bottom of the reactor where it passes through a distributor plate. Make-up feedstreams are added to maintain the desired reactant concentrations.

Operation of most reactor systems is critically dependent upon good mixing for uniform reactor conditions, heat removal, and effective catalyst performance. The process must be controllable and capable of a high production rate. In general, the higher the operating temperature, the greater the capability to achieve high production rate. Because polymerization reactions are typically exothermic, heat transfer out of the reactor is critical to avoid such things as particle agglomeration and runaway reactions. However, as the operating temperature approaches and exceeds the melting point of the polyolefin product, the particles of polyolefin become tacky and melt. For example, non-uniform fluidization of the bed can create "hot spots," which in turn can cause the newly-formed polymer particles to become tacky due to elevated temperatures in the hot spots.

An interplay of forces may result in particles agglomerating with adjacent particles, and may lead to sheeting. In agglomeration, the particles stick together, forming agglomerated particles that affect fluid flow and may be difficult to remove from the system. In sheeting, tacky particles gather on a surface of the reactor system, such as the wall of the reactor vessel, forming a sheet of polymer particles. Progressive cycles in this process may eventually result in the growth of the sheet and its falling into the fluid bed. These sheets can interrupt fluidization, circulation of gas and withdrawal of the product from the reactor, and may require a reactor shutdown for removal.

Prior attempts at reducing sheeting include addition of antistatic agents to the catalyst or fluidized bed itself. Other approaches rely on addition of continuity additives to minimize agglomeration and sheeting. One disadvantage in using continuity additives or antistatic agents is the increased cost they add to the polymerization reaction. Another disadvantage in using continuity additives or antistatic agents is the gas phase reactor may require additional equipment to feed and monitor the level of these additives. Furthermore, the addition of material to the reactor itself tends to require complex monitoring to control the feed rate of the additive.

Therefore, there is a need for improved catalysts and methods for using the same that produce polyolefin products in gas phase fluidized bed reactors that reduce the probability of sheeting and/or agglomeration in the reactor system, and/or reduce or eliminate the need for continuity additives and/or antistatic agents.

SUMMARY

Disclosed herein are methods for fabricating catalysts and the use of the catalysts in gas phase polymer polymerizations.

The method for fabricating a catalyst may comprise contacting a supported catalyst with a monomer under conditions that reduce an overall charge of the catalyst to less than about 75%, or less than about 50%, or less than about 30%, of the initial charge on the catalyst. Polymerization methods may include injecting the catalyst having a reduced charge into a reactor.

Another method for polymerization may comprise injecting a pre-polymerized supported catalyst into a fluidized bed polymerization reactor system at the fluidized bed polymerization reactor system start-up. The catalyst may have a charge of less than about 0.3 μC/g, or less than 0.25 μC/g. A monomer can be contacted with the pre-polymerized supported catalyst. In some embodiments, no antistatic agents are added to the fluidized bed polymerization reactor system during start-up. In some embodiments, after start-up injection of the catalyst into the reactor system is discontinued and a different catalyst is then injected into the reactor system.

Other polymerization methods disclosed herein may include introducing a pre-polymerized catalyst and one or more olefins into a gas phase fluidized bed reactor, where the reactor is operated at conditions sufficient to produce a polyolefin and the polymerization is carried out in substantial absence of any continuity additives. In some embodiments, the introduction of one or more continuity additives to the gas phase reactor can be stopped after a period of time has elapsed from the reactor start-up such that after the introduction of the one or more continuity additives is stopped the polymerization is continued in the substantial absence of the one or more continuity additives.

Also disclosed herein is a pre-polymerized catalyst that includes a catalyst having a support and a catalytically active material on the support. The pre-polymerized catalyst can also include a polymer coupled to the catalyst. The pre-polymerized catalyst may have a ratio by weight of primary monomer in the polymer to the catalyst is less than about 30:1, or less than about 20:1. The overall charge of the pre-polymerized catalyst may be less than about 0.3 μC/g, or less than about 0.25 μC/g.

DETAILED DESCRIPTION

Figure 1:
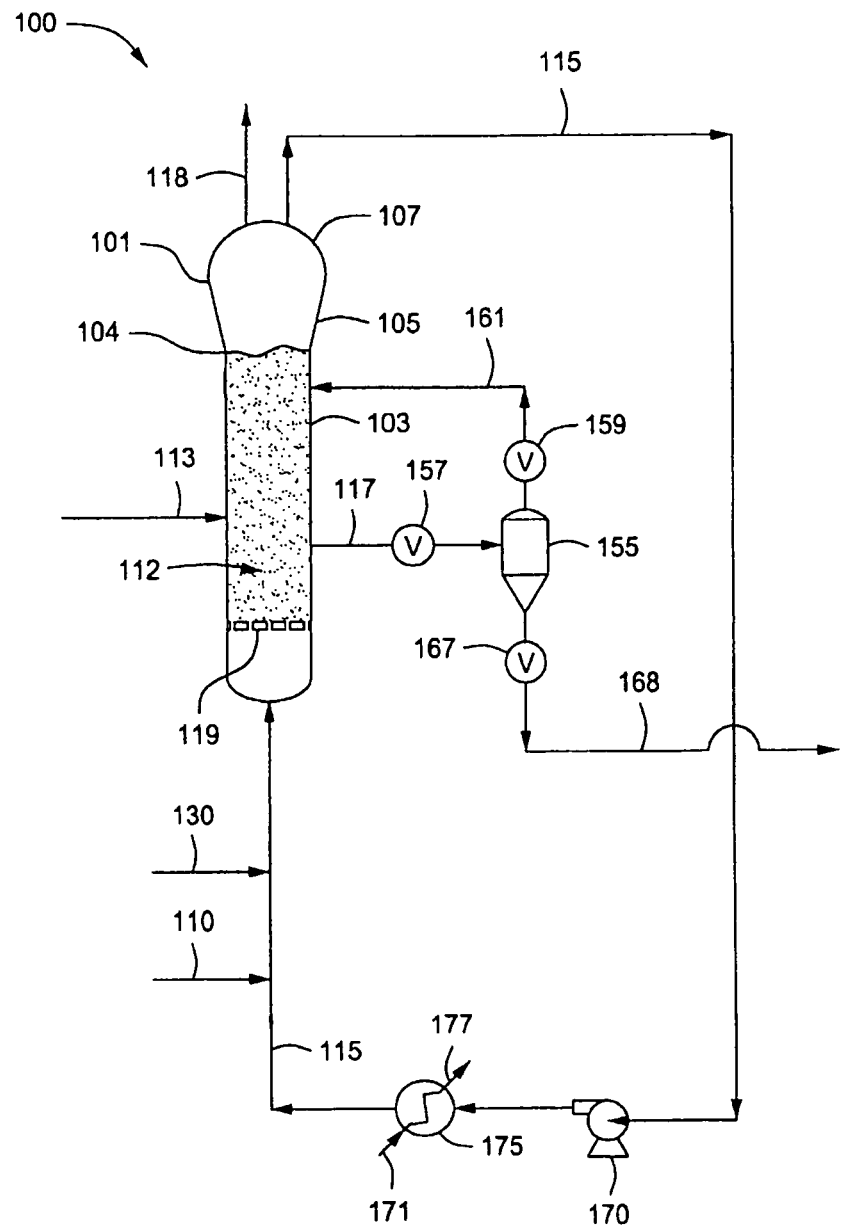
FIG. 1 is a schematic representation of an illustrative gas phase polymerization reactor system.

Before the present compounds, components, compositions, and/or methods are disclosed and described, it is to be understood that unless otherwise indicated this invention is not limited to specific compounds, components, compositions, reactants, reaction conditions, structures, or the like, and as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

All concentrations expressed herein are concentrations in terms of parts per million by volume unless otherwise stated.

Many catalyst systems and catalysts typically employed in gas-phase polymerization processes may present operability issues due either to their physical form, reaction kinetics, or to entrainment static. Without wishing to be bound by any theory, it is believed that entrainment static is one of the key drivers for dome sheeting with various catalysts, particularly metallocene-based catalysts. Entrainment static is generally characterized by the charging of resin and catalyst particles by frictional contact with the walls of the reactor vessel and different parts of the recycle system. High entrainment static is believed to begin immediately with the introduction of catalyst during start-up, and develop during an initial low grade reaction that is followed by rapid activation to full productivity. During this induction period the entrainment static can cause sheeting and other operability issues.

Again not wishing to be bound to any particular theory, it is believed that the entrainment static, as well as a static charge present on some catalysts, especially metallocene catalysts, causes the catalyst to migrate to the walls of the fluidized bed reactor vessel. As the gas velocity along the wall is very low, the heat that is generated at the wall is not carried away by the gas moving through the fluidized bed. Therefore, the polymer particles being formed along the wall of the reactor vessel become tacky and stick to the wall of the reactor vessel, thereby initiating sheeting. The static charge is also believed to be responsible, at least in part, for sheeting and chunking in the dome section of the reactor vessel.

Described herein are catalyst pre-polymerization methods that may be used to reduce the static charge of the catalyst. The catalyst pre-polymers having reduced static charge may then be used in polymerization processes to reduce the probability of sheeting and/or polymer agglomeration in polymerization reaction systems. Thus, the methods and pre-polymerized catalysts described herein may be used to lower the cost of using catalyst by improving operability and consequently reduction or elimination of continuity aids.

It has been discovered that by pre-polymerizing a supported catalyst for use in a fluidized bed polymerization reactor system in a polymerization process, the amount of sheeting and particle agglomeration (also referred to as "chunking") is reduced. Additionally, the pre-polymerized catalyst may exhibit a longer shelf life, as exhibited by a slow decay of the pre-polymer. The longer shelf life may be particularly evident for metallocene catalysts being pre-polymerized with ethylene.

The catalyst can be pre-polymerized using any suitable polymerization or "pre-polymerization" process. It has been surprisingly discovered that use of continuity additives can be reduced or avoided when using the pre-polymerized catalyst in gas phase fluidized bed polymerization reactors. For example, gas phase fluidized bed polymerization using the pre-polymerized catalyst can be carried out in the substantial absence of continuity additives. As used herein, the terms "substantial absence of continuity additives" and "substantially free of continuity additives" refer to a polymerization process in which no continuity additive is intentionally added thereto. The terms "substantial absence" and "substantially free of" can also refer to a concentration of continuity additive within the gas phase fluidized bed reactor is less than 5 ppmw, less than 4 ppmw, less than 3 ppmw, less than 2 ppmw, less than 1 ppmw, less than 0.5 ppmw, or less than 0.1 ppmw, based on the polymer production rate.

As used herein, the term "continuity additive" refers to a compound or composition that when introduced into a gas phase fluidized bed reactor can influence or drive the static charge (negatively, positively, or to zero) in the fluidized bed. Continuity additives can also be referred to as "anti-static agents" or "anti-static additives." Illustrative examples of commonly used continuity additives include MgO, ZnO, $Al_2O_3$, CuO, alcohols, oxygen, nitric oxide, $V_2O_5$, $SiO_2$, $TiO_2$, $Fe_2O_3$, water, ketones containing up to 7 carbon atoms, aluminum stearate, aluminum distearate, ethoxlated amines, ethylenimine copolymers, polyethylenimines having the formula —$(CH_2$—$CH_2$—$NH)_n$—, where n can be from about 10 to about 10,000, and the like. Commercially available continuity additives include Irgastat AS-990 available from Huntsman, Lupasol FG available from BASF, KEMAMINE® available from Crompton Corporation, and the ATMER family of products available from ICI America Inc.

The pre-polymerized catalyst and one or more olefins can be introduced to a gas phase fluidized bed reactor ("polymerization reactor" or "reactor") operated at conditions sufficient to produce one or more polyolefin products. The reactor can be substantially free of any continuity additives during polymerization from an initial start-up of the reactor through shutdown of the reactor. In another example, a continuity additive can be introduced during initial start-up of the reactor, but after polymerization begins and continues for a period of time, introduction of the continuity additive can be stopped and polymerization can continue substantially free of any continuity additives. In still another example, the reactor can be started without any continuity additives being introduced thereto, but after carrying out polymerization for a period of time a continuity additive can then be introduced to the reactor.

The period of time during which the continuity additive can be used during the initial start-up of the polymerization reactor can be less than about 20 hours, less than about 15 hours, less than about 12 hours, less than about 10 hours, less than about 8 hours, less than about 4 hours, less than about 2 hours, or less than about 1 hour. The period of time polymerization can be carried out substantially free of any continuity additives can range from a few minutes to several hours, days, or even weeks. For example, polymerization can be carried out in the gas phase reactor in the substantial absence of any continuity additives for a duration of time ranging from a low of about 2 hours, about 5 hours, about 10 hours, about 15 hours, about 20 hours, or about 25 hours to a high of about 1 day, 2 days, 3 days, 4 days, 5 days, 10 days, or about 15 days.

It has also been surprisingly discovered that gas phase fluidized bed polymerization, substantially free from any continuity additive, can be carried out with little to no generation of fouling, e.g. agglomerates, chunks, and/or sheets, within the reactor. The gas phase polymerization can be operated on a continuous or semi-continuous basis, i.e. without shutdown, for a period of time ranging from a few hours to several days or weeks. For example, the polymerization can be operated for about a day, about 2 days, about 3 days, about 5 days, about 7 days, about 10 days, or about 15 days, with no observable fouling occurring therein. All or any portion of the period of time the gas phase polymerization is continued can be done so in the substantial absence of any continuity additives.

Contacting the catalyst with one or more monomers ("pre-polymerization monomers") can reduce an overall charge of the catalyst to less than an initial charge of the catalyst. For example, the pre-polymerized catalyst may have a charge that is 75% of or less than the initial charge of the un-pre-polymerized catalyst. In some embodiments, the pre-polymerized catalyst may have a charge that is less than about 0.3 μC/g. The pre-polymerized catalyst can then be introduced into a polymerization reactor where the pre-polymerized catalyst can be contacted with one or more monomers ("polymerization monomers") under conditions sufficient to produce a polyolefin product. The pre-polymerization monomers and the polymerization monomers can be the same or different.

In some embodiments, the pre-polymerized catalyst comprises a catalyst including a support and a catalytically active material on the support. A polymer is coupled to the catalyst, wherein (a) a ratio by weight of primary monomer in the polymer to the catalyst is less than about 30:1; and/or (b) an overall charge of the catalyst and polymer is less than about 0.3 microcoulombs per gram (μC/g).

Catalyst Components and Catalyst Systems

The pre-polymerized catalyst can include a catalyst that includes a catalytically active material on a support, and a polymer (also referred to as a "pre-polymer") coupled to the catalyst, e.g., formed thereon during pre-polymerization of the catalyst. Illustrative catalysts may include metallocene catalysts, Ziegler-Natta catalysts, and chromium- and titanium-based catalysts.

Metallocene compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene compounds can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and, in a particular example, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In another example, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof (as discussed and described in more detail below), and heterocyclic versions thereof.

The metal atom "M" of the metallocene compound can be selected from the group consisting of Groups 3 through 12 atoms and lanthanide Group atoms in one example; and selected from the group consisting of Groups 3 through 10 atoms in another example, and selected from the group consisting of Sc, Ti, Zr, Hf, V, Nb, Ta, Mn, Re, Fe, Ru, Os, Co, Rh, Ir, and Ni in yet another example; and selected from the group consisting of Groups 4, 5, and 6 atoms in yet another example, and Ti, Zr, Hf atoms in yet another example, and Hf in yet a more particular example. The oxidation state of the metal atom "M" can range from 0 to +7 in one example; and in a more particular example, can be +1, +2, +3, +4 or +5; and in yet a more particular example can be +2, +3 or +4. The groups bound to the metal atom "M" are such that the compounds described below in the formulas and structures are electrically neutral, unless otherwise indicated. The Cp ligand(s) forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene compounds can be represented by the formula (I):

$$Cp^A Cp^B MX_n \qquad (I)$$

where M is as described above; each X is chemically bonded to M; each Cp group is chemically bonded to M; and n is 0 or an integer from 1 to 4, and either 1 or 2 in a particular example.

The ligands represented by $Cp^A$ and $Cp^B$ in formula (I) can be the same or different cyclopentadienyl ligands or ligands isolobal to cyclopentadienyl, either or both of which can contain heteroatoms and either or both of which can be substituted by a group R. In another example $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in structure (I) as well as ring substituents in structures Va-d, discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluroethyl, difluroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris (trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl and the like. In one example, at least two R groups (two adjacent R groups in another example) are joined to form a ring structure having from 3 to 30 atoms selected from the group consisting of carbon, nitrogen, oxygen, phosphorous, silicon, germanium, aluminum, boron and combinations thereof. Also, a substituent group R such as 1-butanyl can form a bonding association to the element M.

Each X in the formula (I) above and for the formula/structures (II) through (Va-d) below is independently selected from the group consisting of: any leaving group, in one example; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular example; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular example; hydride, chloride, fluoride, methyl, phenyl, phenoxy, benzoxy, tosyl, fluoromethyls and fluorophenyls in yet a more particular example; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls in yet a more particular example; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular example; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular example; and fluoride in yet a more particular example.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis (N-methylanilide), dimethylamide, dimethylphosphide radicals and the like. In one example, two or more X's form a part of a fused ring or ring system. In at least one example, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene compound can include those of formula (I) where $Cp^A$ and $Cp^B$ are bridged to each other by at least one bridging group, (A), such that the structure is represented by formula (II):

$$Cp^A(A)Cp^BMX_n \qquad (II)$$

These bridged compounds represented by formula (II) are known as "bridged metallocenes." The elements $Cp^A$, $Cp^B$, M, X and n in structure (II) are as defined above for formula (I); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In another example, the bridging group (A) can also include substituent groups R as defined above (for formula (I)) including halogen radicals and iron. In another example, the bridging group (A) can be represented by $C_1$ to $C_6$ alkylenes, substituted $C_1$ to $C_6$ alkylenes, oxygen, sulfur, $R'_2C=$, $R'_2Si=$, $=Si(R')_2Si(R'_2)=$, $R'_2Ge=$, and $R'P=$, where "$=$" represents two chemical bonds, R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In another example, the bridged metallocene compound of formula (II) includes two or more bridging groups (A). In one example, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls comprise from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular example, bridging group (A) can have 5 to 7 ring members. The ring members can be selected from the elements mentioned above, and, in a particular example, can be selected from one or more of B, C, Si, Ge, N and O. Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In another example, one or two carbon atoms can be replaced by at least one of Si and Ge. The bonding arrangement between the ring and the Cp groups can be either cis-, trans-, or a combination thereof.

The cyclic bridging groups (A) can be saturated or unsaturated and/or can carry one or more substituents and/or can be fused to one or more other ring structures. If present, the one or more substituents can be selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular example) such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms.

The ligands $Cp^A$ and $Cp^B$ of formula (I) and (II) can be different from each other. The ligands $Cp^A$ and $Cp^B$ of formula (I) and (II) can be the same.

The metallocene compound can include bridged mono-ligand metallocene compounds (e.g., mono cyclopentadienyl catalyst components). In this example, the at least one metallocene catalyst compound can be a bridged "half-sandwich" metallocene represented by the formula (III):

$$Cp^A(A)QMX_r \qquad (III)$$

where $Cp^A$ is as defined above for formula (I) and is bound to M; (A) is a bridging group bonded to Q and $Cp^A$; and an atom from the Q group is bonded to M; and r is an integer 0, 1 or 2.

In formula (III), $Cp^A$, (A) and Q can form a fused ring system. The X groups of formula (III) are as defined above in formulas (I) and (II). In another example, $Cp^A$ is selected from the group consisting of cyclopentadienyl, indenyl, tetrahydroindenyl, fluorenyl, substituted versions thereof, and combinations thereof.

Q, in formula (III), can be a heteroatom-containing ligand in which the bonding atom (the atom that is bonded with the metal M) is selected from the group consisting of Group 15 atoms and Group 16 atoms. The bonding atom can be selected from the group consisting of nitrogen, phosphorus, oxygen, or sulfur atoms. The bonding atom can be selected from the group consisting of nitrogen and oxygen. Illustrative Q groups can include, but are not limited to, alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds having Group 15 and Group 16 atoms capable of bonding with M.

The metallocene compound can be an unbridged "half sandwich" metallocene represented by the formula (IVa):

$$Cp^AMQ_qX_w \qquad (IVa)$$

where $Cp^A$ is as defined above for the Cp groups in formula (I) and is a ligand that is bonded to M; each Q is independently bonded to M; X is a leaving group as described above in formula (I); w ranges from 0 to 3, and is 0 or 3 in one example; and q ranges from 0 to 3, and is 0 or 3 in at least one example.

$Cp^A$ can be selected from the group consisting of cyclopentadienyl, indenyl, tetrahydroindenyl, fluorenyl, substituted version thereof, and combinations thereof. In formula (IVa), Q is selected from the group consisting of ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

$$Cp^AM(W_2GZ)X_y$$

or $$T(Cp^AM(W_2GZ)X_y)_m \qquad (IVb)$$

where M, $Cp^A$, and X are as defined above; $W_2GZ$ forms a polydentate ligand unit (e.g., pivalate), where at least one of the W groups form a bond with M, and is defined such that each W is independently selected from the group consisting of —O—, —NR—, —CR$_2$— and —S—; G is either carbon or silicon; and Z is selected from the group consisting of R, —OR, —NR$_2$, —CR$_3$, —SR, —SiR$_3$, —PR$_2$, and hydride, providing that when W is —NR—, then Z is selected from the group consisting of —OR, —NR$_2$, —SR, —SiR$_3$, —PR$_2$; and provided that neutral valency for W is satisfied by Z; and where each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; y is 1 or 2 in a particular example; T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; where each T group bridges adjacent "$Cp^AM(W_2GZ)X_y$" groups, and is chemically bonded to the $Cp^A$ groups; and m is an integer from 1 to 7. In one example, m is an integer from 2 to 6.

It is contemplated that the metallocene compounds discussed and described above include their structural or optical or enantiomeric isomers (racemic mixture), and, in one example, can be a pure enantiomer. As used herein, a single, bridged, asymmetrically substituted metallocene compound having a racemic and/or meso isomer does not, itself, constitute at least two different bridged, metallocene compounds. The "metallocene catalyst" or "metallocene compound" can include any combination of any "example" discussed and described herein.

In addition to the metallocene compounds discussed and described above, other suitable metallocene compounds can include, but are not limited to, metallocenes discussed and described in U.S. Pat. Nos. 7,179,876; 7,169,864; 7,157,531; 7,129,302; 6,995,109; 6,958,306; 6,884,748; 6,689,847; U.S. Patent Application Publication No. 2007/0055028; and WO Publication Nos. WO 97/22635; WO 00/69922; WO 01/30860; WO 01/30861; WO 02/46246; WO 02/50088; WO 04/026921; and WO 06/019494.

As used herein, the terms "co-catalysts" and "activators" are used interchangeably and are defined to be any compound or component which can activate a metallocene compound as defined above, for example, a Lewis acid or a non-coordinating ionic activator or ionizing activator or any other compound that can convert a neutral metallocene catalyst component to a metallocene cation. In one example, the activator can be aluminoxane, and/or to also use preferably bulky, compatible ionizing activators, neutral or ionic, such as tri(n-butyl) ammonium tetrakis(pentaflurophenyl) boron or a trisperfluorophenyl boron metalloid precursor which ionize the neutral metallocene compound and stabilize its resulting metallocene cation. There are a variety of methods for preparing aluminoxanes and modified aluminoxanes, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,278,119; 5,391,793; and 5,391,529; European Application Publication Nos. EP 0561476A1 and EP 0594218A1; European Patent No. EP 0279586B1; and WO Publication No. WO 94/10180.

Ionizing compounds can include or contain an active proton, or some other cation associated with but not coordinated or only loosely coordinated to the remaining ion of the ionizing compound. Such compounds and the like are described in European Patent Application Publications EP 0570982A1; EP 0520732A1; EP 0495375A1; EP 0426637A2; EP 0500944A1; EP 0277003A1; EP 0277004A1; U.S. Pat. Nos. 5,153,157; 5,198,401; 5,066,741; 5,206,197; 5,241,025; 5,387,568; 5,384,299; and U.S. patent application Ser. No. 08/285,380, filed Aug. 3, 1994. Combinations of activators are also contemplated, for example, aluminoxanes and ionizing activators in combinations, see for example, WO 94/07928; U.S. application Ser. No. 08/155,313 filed Nov. 19, 1993; and U.S. Pat. No. 5,153,157. Two or more metallocenes can be as described above can be combined to form a catalyst system, see for example, the mixed catalysts discussed and described in U.S. Pat. Nos. 5,281,679 and 5,466,649.

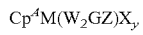

Chromium catalysts can be obtained by calcining a chromium compound carried on an inorganic oxide carrier in a non-reducing atmosphere to activate it such that at least a portion of the carried chromium atoms is converted to hexavalent chromium atoms ($Cr^{+6}$) commonly referred to in the art as the Phillips catalyst. Suitable chromium catalysts can include disubstituted chromates, such as $CrO_2(OR)_2$; where R is triphenylsilane or a tertiary polyalicyclic alkyl. The chromium catalyst system can further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Ziegler-Natta catalysts are typically based on titanium chlorides, magnesium chlorides and organometallic alkyl aluminum compounds. Illustrative Ziegler-Natta catalysts are disclosed in EP 103 120; EP 102 503; EP 0 231 102; EP 0 703 246; RE 33,683; U.S. Pat. No. 4,302,565; U.S. Pat. No. 5,518, 973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5, or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Combinations of one or more of the above described catalysts can be used. For example, metallocene catalysts can be combined to form blend compositions as discussed and described in WO Publication No. WO 90/03414. In another example, mixed metallocenes as discussed and described in U.S. Pat. Nos. 4,937,299 and 4,935,474, can be used to produce polymers having a broad molecular weight distribution and/or a multimodal molecular weight distribution.

In one example, at least one metallocene catalyst can be combined with at least one non-metallocene or traditional Ziegler-Natta catalyst or catalyst system. Illustrative and non-limiting examples of combining metallocene catalysts and non-metallocene or traditional Ziegler-Natta catalysts can be as discussed and described in U.S. Pat. Nos. 4,701,432; 5,124, 418; 5,077,255; 5,183,867; 5,391,660 and 5,395,810.

As used herein, the terms "carrier" and "support" are used interchangeably and can be any support material, preferably a porous support material, such as for example, talc, inorganic oxides, inorganic chlorides, for example magnesium chloride, and resinous support materials such as polystyrene or polystyrene divinyl benzene polyolefins or polymeric compounds or any other organic or inorganic support material and the like, or mixtures thereof. Preferred support materials can be or include inorganic oxide materials, which include those of Groups 2, 3, 4, 5, 13 or 14 metal oxides. In a preferred example, the catalyst support materials can include silica, alumina, silica-alumina, and mixtures thereof. Other inorganic oxides that can be employed either alone or in combination with silica, alumina, or silica-alumina can be magnesia, titania, zirconia, and the like.

The catalyst support can have a surface area ranging from a low of about 1 $m^2/g$, about 50 $m^2/g$, or about 100 $m^2/g$ to a high of about 400 $m^2/g$, about 500 $m^2/g$, or about 800 $m^2/g$. The catalyst support can have a pore volume ranging from a low of about 0.01 $cm^3/g$, about 0.1 $cm^3/g$, about 0.8 $cm^3/g$, or about 1 $cm^3/g$ to a high of about 2 $cm^3/g$, about 2.5 $cm^3/g$, about 3 $cm^3/g$, or about 4 $cm^3/g$. The catalyst support can have an average particle size ranging from a low of about 1 µm, about 5 µm, about 10 µm, or about 20 µm to a high of about 50 µm, about 100 µm, about 200 µm, or about 500 µm. The average pore size of the catalyst support can range from about 10 Å to about 1,000 Å, preferably from about 50 Å to about 500 Å, and more preferably from about 75 Å to about 350 Å.

In one example, a bi-component catalyst system can be used. As used herein, the term "bi-component catalyst system" refers to catalyst systems having at least two catalyst components, and may indeed include catalyst systems including several different catalyst components.

In one example the bi-component catalyst system can include catalyst systems where differing catalysts are present on a single substrate. In another example, bi-component catalyst systems can include systems where catalysts are not on a single substrate. Such catalyst systems may include mixtures of catalysts in a common carrier, as well as catalysts independently fed to the reactor system. In a further approach, one or more catalysts can be employed along with a catalyst system having differing catalysts present on a single substrate.

Catalyst Pre-Polymerization

A catalyst (used interchangeably herein with catalyst system) can be pre-polymerized under conditions that reduce the overall charge of the catalyst. That is, the pre-polymerized catalyst has an overall charge that is less than the catalyst's charge in its initial state prior to pre-polymerization.

Most silica supported catalysts charge negatively with a specific charge of about 0.300-0.600 micro coulombs per gram (µC/g). Table 1 lists specific charges for various exemplary catalysts. The magnitude (i.e., the absolute value) of the catalyst's charge is shown in Table 1. As seen in Table 1, the highest charge levels, approximately 6-8 times the magnitude of the catalysts' individual charges are seen with the plain dehydrated silica.

TABLE 1

Specific Charges of Exemplary Catalysts and Catalyst Components

| Catalyst | Specific Charge (µC/g) |
|---|---|
| Silica supported bis(1-methyl-3-butylcyclopentadienyl) zirconium dichloride with MAO and 1-3 wt % aluminum stearate. | 0.318 |
| Silica supported dimethylsilane bis(indenyl) zirconium dichloride with MAO and 1-3 wt % aluminum stearate. | 0.366 |
| Silica supported bis(1-methyl-3-butylcyclopentadienyl) zirconium dichloride with MAO. | 0.567 |
| Ziegler-Natta | 0.294 |
| Cr-based catalyst | 0.320 |
| 948 Silica from Grace Davidson (dehydrated at 600° C.) | 2.650 |

A method for pre-polymerizing a supported catalyst can include contacting the catalyst with one or more monomers under conditions that reduce an overall charge of the (pre-polymerized) catalyst to less than about 75%, or less than 60%, or less than 50%, or less than 40%, or less than 35%, or less than 30%, or less than 25%, of the initial charge of the unpre-polymerized supported catalyst.

Typically, the initial charge of the supported catalyst can be in the range of about 0.300-0.600 µC/g as noted above, but may be higher or lower. Accordingly, the pre-polymerized catalyst may have a charge of less than about 0.450 µC/g, less than about 0.350 µC/g, less than about 0.300 µC/g, less than about 0.250 µC/g, less than about 0.200 µC/g, or less than about 0.150 µC/g. For example, the catalyst system from Table 1 comprising silica supported bis(1-methyl-3-butylcyclopentadienyl) zirconium dichloride with MAO and 1-3 wt % aluminum stearate can be pre-polymerized under conditions that reduce the overall charge of the pre-polymerized catalyst to less than about 0.2385 µC/g (=0.318 µC/g×75%).

The catalyst may be pre-polymerized in any pre-polymerization process using any monomer/comonomer wherein the conditions are such that the overall charge of the pre-polymerized catalyst is less than overall charge of the initial catalyst. For example, the pre-polymerization may be conducted at low temperature and low monomer partial pressure, thereby slowing the rate of reaction and allowing more control over the pre-polymerization of the catalyst.

The pre-polymerization may be carried out batchwise or continuously in gas, solution, or slurry phase. The illustrative systems and approaches set forth below in the section entitled "Polymerization Process", or variants thereof, may be used to pre-polymerize the catalyst.

The supported catalyst system may be pre polymerized using one or more olefins. Any olefin monomer or combination of monomers may be used. Suitable olefins can include, but are not limited to, ethylene, and/or other olefins having from 3 to about 20 carbon atoms, such as $C_3$-$C_{20}$ α-olefins, $C_3$-$C_{12}$ α-olefins, or $C_3$-$C_8$ α-olefins. In preferred embodiments, the catalyst is pre-polymerized with ethylene and one or more comonomers. The comonomer may be another olefin having from 3 to 30 carbon atoms. Preferred comonomers are hexene, butene, and octene. In some embodiments, the catalyst is pre-polymerized in the presence of ethylene and hexene.

The pre-polymer can be the same polymer for which the pre-polymerized catalyst is intended to be used to produce. Alternatively, the pre-polymer can be different from the polymer for which the pre-polymerized catalyst is intended to be used to produce. In one example, the pre-polymer may be polyethylene and the pre-polymerized catalyst can be intended for polyethylene production.

The olefin can be pre-polymerized in the presence of the supported catalyst prior to the main polymerization of the olefin. The pre-polymerization is carried out, for example, by polymerizing about 1 to about 1,000 g, preferably about 5 to about 500 g, more preferably about −10 to about 200 g, of the olefin monomer and/or comonomer per gram-atom of the transition metal compound in the supported catalyst.

The pre-polymerization temperature may be about −20° to about 70° C., preferably about −10° to about 60° C., more preferably about 0° to about 50° C.

The pre-polymerization may be carried out under atmospheric pressure or elevated pressures. The pre-polymerization may be carried out in the presence of a molecular weight controlling agent such as hydrogen. In some embodiments, the amount of the molecular weight controlling agent is limited to an amount in which at least a pre-polymer having an intrinsic viscosity, measured in decalin (dl) at 135° C., of at least about 0.2 dl/g, preferably about 0.5 to about 20 dl/g, is produced.

The pre-polymerization may be carried out in the absence of a solvent, or in an inert hydrocarbon medium. In view of operability, it is preferred to carry out the preliminary polymerization in an inert hydrocarbon medium. Inert hydrocarbon mediums can include, but are not limited to, isopentane, hexane, cyclohexane, heptanes, benzene, toluene, and the like.

The concentration of the supported catalyst in the pre-polymerization reaction may be, for example, about $10^{-6}$ to about 1 gram-atom/liter, as the concentration of the metal atom in the supported catalyst.

The ratio by weight of the primary monomer in the pre-polymer to the catalyst can be less than about 500:1 g/g (g monomer in polymer/g catalyst), less than about 400 g/g, less than about 200 g/g, less than about 100 g/g, less than about 40:1 g/g, less than about 30:1 g/g, less than about 20:1 g/g, less than about 15:1 g/g, less than about 10:1 g/g, or less than about 5:1 g/g. For example, the ratio by weight of the primary monomer in the pre-polymer to the catalyst can range from about 0.1:1 g/g to about 35:1 g/g, from about 0.5:1 g/g to about 25:1 g/g, about 1:1 g/g to about 20:1 g/g, or about 2:1 g/g to about 15:1 g/g.

Polymerization Process

Polymers can be made in a variety of processes using the catalysts disclosed herein, including but not limited to, gas phase, gas/solid phase, liquid/solid phase, gas/liquid phase, and gas/liquid/solid phase reactor systems including polymerization reactor systems; gas phase, gas/solid phase, liquid/solid phase, gas/liquid phase, and gas/liquid/solid phase mass transfer systems; gas phase, gas/solid phase, liquid/solid phase, gas/liquid phase, and gas/liquid/solid phase mixing systems; gas phase, gas/solid phase, liquid/solid phase, gas/liquid phase, and gas/liquid/solid phase heating or cooling systems; gas/solid phase and gas/solid/liquid phase drying systems; or any combination thereof.

The reactor can form part of a fluidized bed polymerization reactor system. Gas phase polymerization reactions can be carried out in fluidized bed polymerization reactors, and can also be formed in stirred or paddle-type reactor systems (e.g., stirred bed systems) which include solids in a gaseous environment. While the following discussion will feature fluidized bed systems, where the pre-polymerized catalysts have been found to be especially advantageous, it is to be understood that the general concepts relating to the reduction of a catalyst's static charge, which are discussed relevant to the preferred fluidized bed systems, are also adaptable to the stirred or paddle-type reactor systems as well.

A fluidized bed generally includes a bed of particles in which the static friction between the particles is disrupted. The fluidized bed system can be an open fluidized bed system or a closed fluidized bed system. An open fluidized bed system can include one or more fluids and one or more types of fluidized solid particles and have one or more fluidized bed surfaces that are exposed to an open uncontrolled atmosphere. For example, an open fluidized bed system can be an open container such as an open-top tank or an open well of a batch reactor or of a parallel batch reactor (e.g., microliter chamber). Alternatively, the fluidized bed system can be a closed fluidized bed system. A closed fluidized bed system can include one or more fluids and one or more types of fluidized particles that are generally bounded by a barrier so that the fluids and particles are constrained. For example, a closed fluidized bed system can include a pipeline (e.g., for particle transport); or a re-circulating fluidized bed system, such as the fluidized bed polymerization reactor system depicted in FIG. 1.

A closed fluidized bed system can be in fluid communication with an open fluidized bed system. The fluid communication between a closed fluidized bed system and an open fluidized bed system can be isolatable, for example, using one or more valves. Such isolation valves can be configured for unidirectional fluid flow, such as for example, a pressure relief valve or a check valve. In general, the fluidized bed system (whether open or closed) can be defined by manufactured (e.g., man-made) boundaries comprising one or more barriers. The one or more barriers defining manufactured boundaries can generally be made from natural or non-natural materials. Also, in general, the fluidized bed system (whether open or closed) can be a flow system such as a continuous flow system or a semi-continuous flow (e.g., intermittent-flow) system, a batch system, or a semi-batch system (some-times also referred to as a semi-continuous system). In many instances, fluidized bed systems that are flow systems are closed fluidized bed systems.

The fluidized bed can be formed by flow of a gaseous fluid in a direction opposite gravity. The frictional drag of the gas on the solid particles can overcome the force of gravity and suspend the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, ultimately leading to collapse of the bed. Fluidized beds formed by gases flowing in directions other than vertically include particles flowing horizontally through a pipe, particles flowing downwardly e.g., through a downcomer, etc. Fluidized beds can also be formed by vibrating or otherwise agitating the particles. The vibration or agitation can maintain or place the particles in a fluidized state.

In general terms, a conventional fluidized bed polymerization process for producing resins and other types of polymers can be conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed, cooled, and recycled into the reactor. Product is withdrawn from the reactor and make-up monomer is added to the system, e.g., into the recycle stream or reactor, to replace the polymerized monomer. See for example U.S. Pat. Nos. 4,543,399; 4,588,790; 5,028,670; 5,317,036; 5,352,749; 5,405,922; 5,436,304; 5,453,471; 5,462,999; 5,616,661; 5,668,228; and 6,689,847.

FIG. 1 depicts a flow diagram of an illustrative gas phase polymerization system 100 for making polymers. The polymerization system 100 can include a reactor 101 in fluid communication with one or more discharge tanks 155 (only one shown), compressors 170 (only one shown), and heat exchangers 175 (only one shown). The polymerization system 100 can also include more than one reactor 101 arranged in series, parallel, or configured independent from the other reactors, each reactor having its own associated discharge tanks 155, compressors 170, and heat exchangers 175, or alternatively, sharing any one or more of the associated discharge tanks 155, compressors 170, and heat exchangers 175. For simplicity and ease of description, the polymerization system 100 will be further described in the context of a single reactor train.

The reactor 101 can include a cylindrical section 103, a transition section 105, and a velocity reduction zone or dome 107. The cylindrical section 103 is disposed adjacent the transition section 105. The transition section 105 can expand from a first diameter that corresponds to the diameter of the cylindrical section 103 to a larger diameter adjacent the dome 107. As mentioned above, the location or junction at which the cylindrical section 103 connects to the transition section 105 is referred to as the "neck" or the "reactor neck" 104. The dome 107 has a bulbous shape. One or more cycle fluid lines 115 and vent lines 118 can be in fluid communication with the top head 107. The reactor 101 can include the fluidized bed 112 in fluid communication with the top head 107.

The fluidized bed 112 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed 112, the superficial gas velocity through the bed must exceed the minimum flow required for fluidization which is typically from about 0.06 m/s (0.2 ft/s) to about 0.15 m/s (0.5 ft/sec) for polyolefins. Preferably, the superficial gas velocity is at least 0.06 m/s (0.2 ft/s) above the minimum flow for fluidization or from about 0.12 m/s (0.4 ft/s) to about 0.21 m/s (0.7 ft/s). Ordinarily, the superficial gas velocity will not exceed about 1.5 m/s (5.0 ft/s) and is usually no more than about 0.85 m/s (2.8 ft/s).

In general, the height to diameter ratio of the cylindrical section 103 can vary in the range of from about 2:1 to about 5:1. The range, of course, can vary to larger or smaller ratios and depends, at least in part, upon the desired production capacity and/or reactor dimensions. The cross-sectional area of the dome 107 is typically within the range of from about 2 to about 3 multiplied by the cross-sectional area of the cylindrical section 103.

The velocity reduction zone or dome 107 has a larger inner diameter than the fluidized bed 112. As the name suggests, the velocity reduction zone 107 slows the velocity of the gas due to the increased cross-sectional area. This reduction in gas velocity allows particles entrained in the upward moving gas to fall back into the bed, allowing primarily only gas to exit overhead of the reactor 101 through the cycle fluid line 115. The cycle fluid recovered via line 115 can contain less than about 10% wt, less than about 8% wt, less than about 5% wt, less than about 4% wt, less than about 3% wt, less than about 2% wt, less than about 1% wt, less than about 0.5% wt, or less than about 0.2% wt of the particles entrained in fluidized bed 112.

On start-up, the reactor 101 can be charged with a bed of particulate polymer particles "seedbed" before gas flow is initiated. Such particles help to prevent the formation of localized "hot spots" when catalyst feed is initiated. The seedbed can be the same as the polymer to be formed or different. When different, the seedbed can be withdrawn with the desired newly formed polymer particles as the first product. Eventually, a fluidized bed primarily of desired polymer particles supplants the start-up bed or seedbed.

The reactor feed via line 110 can be introduced to the polymerization system 100 at any point. For example, the reactor feed via line 110 can be introduced to the cylindrical section 103, the transition section 105, the velocity reduction zone 107, to any point within the cycle fluid line 115, or any combination thereof. Preferably, the reactor feed 110 is introduced to the cycle fluid in line 115 before or after the heat exchanger 175. In FIG. 1, the reactor feed via line 110 is depicted entering the cycle fluid in line 115 after the heat exchanger 175. The catalyst feed via line 113 can be introduced to the polymerization system 100 at any point. Preferably the catalyst feed via line 113 is introduced to the fluidized bed 112 within the cylindrical section 103.

The cycle fluid via line 115 can be compressed in the compressor 170 and then passed through the heat exchanger 175 where heat can be exchanged between the cycle fluid and a heat transfer medium. For example, during normal operating conditions a cool or cold heat transfer medium via line 171 can be introduced to the heat exchanger 175 where heat can be transferred from the cycle fluid in line 115 to produce a heated heat transfer medium via line 177 and a cooled cycle fluid via line 115. The heat exchanger 175 can be used to cool the fluidized bed 112 or heat the fluidized bed 112 depending on the particular operating conditions of the polymerization system 100, e.g. start-up, normal operation, shut down, polymer product transition period, and the like. Illustrative heat transfer mediums can include, but are not limited to, water, air, glycols, or the like. It is also possible to locate the compressor 170 downstream from the heat exchanger 175 or at an intermediate point between a plurality of heat exchangers 175.

After cooling, all or a portion of the cycle fluid via line 115 can be returned to the reactor 101. The cooled cycle fluid in line 115 can absorb the heat of reaction generated by the polymerization reaction. The heat exchanger 175 can be of any type of heat exchanger. Illustrative heat exchangers can include, but are not limited to, shell and tube, plate and frame, U-tube, and the like. For example, the heat exchanger 175 can be a shell and tube heat exchanger where the cycle fluid via line 115 can be introduced to the tube side and the heat transfer medium can be introduced to the shell side of the heat exchanger 175. If desired, several heat exchangers can be employed, in series, parallel, or a combination of series and parallel, to lower or increase the temperature of the cycle fluid in stages.

Preferably, the cycle fluid via line 115 is returned to the reactor 101 and to the fluidized bed 112 through fluid distributor plate ("plate") 119. The plate 119 is preferably installed at the inlet to the reactor 101 to prevent polymer particles from settling out and agglomerating into a solid mass and to prevent liquid accumulation at the bottom of the reactor 101 as well to facilitate easy transitions between processes which contain liquid in the cycle stream 115 and those which do not and vice versa. Although not shown, the cycle gas via line 115 can be introduced into the reactor 101 through a deflector disposed or located intermediate an end of the reactor 101 and the distributor plate 119. Illustrative deflectors and distributor plates suitable for this purpose can be as discussed and described in U.S. Pat. Nos. 4,877,587; 4,933,149; and 6,627,713.

The catalyst feed via line 113 can be introduced to the fluidized bed 112 within the reactor 101 through one or more injection nozzles (not shown) in fluid communication with line 113. In another example, the catalyst feed via line 113 can be introduced to the cycle fluid in line 115 between the reactor 101 and the heat exchanger 175, for example. A continuity additive can be introduced to the polymerization system 100 via an appropriate mechanism such as feed line 130 to cycle line 115. In another example, the continuity additive via line 130 can be introduced directly to the fluidized bed 112, the cycle line 115, or both.

Fluid via line 161 can be separated from a polymer product recovered via line 117 from the reactor 101. The fluid can include unreacted monomer(s), hydrogen, ICA(s), and/or inerts. The separated fluid can be introduced to the reactor 101. The separated fluid can be introduced to the recycle line 115 (not shown). The separation of the fluid can be accomplished when fluid and product leave the reactor 101 and enter the product discharge tanks 155 (one is shown) through valve 157, which can be, for example, a ball valve designed to have minimum restriction to flow when opened. Positioned above and below the product discharge tank 155 can be conventional valves 159, 167. The valve 167 allows passage of product therethrough. For example, to discharge the polymer product from the reactor 101, valve 157 can be opened while valves 159, 167 are in a closed position. Product and fluid enter the product discharge tank 155. Valve 157 is closed and the product is allowed to settle in the product discharge tank 155. Valve 159 is then opened permitting fluid to flow via line 161 from the product discharge tank 155 to the reactor 101. Valve 159 can then be closed and valve 167 can be opened and any product in the product discharge tank 155 can flow into and be recovered via line 168. Valve 167 can then be closed. Although not shown, the product via line 168 can be introduced to a plurality of purge bins or separation units, in series, parallel, or a combination of series and parallel, to further separate gases and/or liquids from the product. The particular timing sequence of the valves 157, 159, 167, can be accomplished by use of conventional programmable controllers which are well known in the art.

Another preferred product discharge system which can be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The reactor 101 can be equipped with one or more vent lines 118 to allow venting the bed during start up, normal operation, shut down, transition between polymer products, and the like. The reactor 101 can be free from the use of stirring and/or wall scraping. The cycle line 115 and the elements therein (compressor 170, heat exchanger 175) can be smooth surfaced and devoid of unnecessary obstructions so as not to impede the flow of cycle fluid or entrained particles.

The conditions for polymerizations vary depending upon the monomers, catalysts, catalyst systems, and equipment availability. The specific conditions are known or readily derivable by those skilled in the art. For example, the temperatures can be within the range of from about −10° C. to about 140° C., often about 15° C. to about 120° C., and more often about 70° C. to about 110° C. Pressures can be within the range of from about 10 kPag to about 10,000 kPag, such as about 500 kPag to about 5,000 kPag, or about 1,000 kPag to about 2,200 kPag, for example. Additional details of polymerization can be found in U.S. Pat. No. 6,627,713, for example.

Various systems and/or methods can be used to monitor and/or control the degree or level of fouling or agglomeration within the reactor 101. For example, if the polymerization system 100 is operated in condensed mode, a common technique for monitoring the reactor 101 can include monitoring a stickiness control parameter ("dMRT") such as a reduced melt initiation temperature or "dMIT" value, which can provide an estimate as to the degree of polymer stickiness within the reactor. Moderated startup or restart conditions can include operating the reactor at a dMIT of about 0° C. or a dMIT within about ±1° C., about ±1.5° C., or about ±2° C. for a period of time when the normal dMIT ranges from about 5° C. to about 10° C. Additional details of monitoring a stickiness control parameter can be as discussed and described in U.S. Patent Application Publication No. 2008/0065360 and U.S. Provisional Patent Application No. 60/842,747. Another method for monitoring polymerization can include estimating acoustic emissions within the reactor 101, which can also provide an estimate as to the degree of polymer stickiness within the reactor. Normal or typical acoustic emissions conditions can be modified such that optimal values during, for example, start-up of the polymerization system 100 or a transition between the production different polymer products. Additional details of monitoring a polymerization reactor via acoustic emissions can be as discussed and described in U.S. Publication No. 2007/0060721.

Operating the polymerization system 100 in condensed mode can include introducing an inert condensable fluid to the process to increase the cooling capacity of the polymerization system 100. These inert condensable fluids are referred to as induced condensing agents or ICA's. For further details of a condensed mode processes see, for example, U.S. Pat. Nos. 5,352,749; 5,436,304; 5,405,922; and 7,122,607; WO Publication No. WO 2005/113615A2.

Additional reactor details and means for operating the reactor can be as discussed and described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

Other gas phase processes can include, for example, series or multistage polymerization processes. Suitable gas phase processes can also include those discussed and described in U.S. Pat. Nos. 3,709,853; 4,003,712; 4,011,382; 4,302,566; 4,543,399; 4,588,790; 4,882,400; 5,028,670; 5,352,749; 5,405,922; 5,541,270; 5,627,242; 5,665,818; 5,677,375; 6,255,426 and European Patent Nos. EP 0649992B1, EP 0802202B1, EP 0634421B1; European Patent Publication Nos. EP 0794200A2; EP0802202A1, and EP 1806368A2; and Belgian Patent No. 839,380.

The polymerization system 100 can be capable of producing greater than 227 kg/hr (500 lbs/hr) to about 90,900 kg/hr (300,000 lbs/hr) or more of polymer product. In another example the reactor system 100 can produce greater than about 455 kg/hr (1000 lbs/hr), more preferably greater than about 4,540 kg/hr (10,000 lbs/hr), even more preferably greater than about 11,300 kg/hr (25,000 lbs/hr), still more preferably greater than about 15,900 kg/hr (35,000 lbs/hr), still even more preferably greater than about 22,700 kg/hr (50,000 lbs/hr) and most preferably greater than about 29,000 kg/hr (65,000 lbs/hr) to greater than 45,500 kg/hr (100,000 lbs/hr) of polymer product.

Stirred bed system include beds stirred or otherwise agitated by a member such as a paddle or plunger rotating or moving through the bed (e.g., stirred bed reactor, blender, etc.). Other types of stirred bed systems can be formed by a rotating drum (e.g., with or without internal baffles to enhance mixing), a vessel moving in a see-saw manner, agitation including ultrasonic vibrations applied to the particles or their container, etc.

In some embodiments, the reactor may form part of a liquid phase reactor system. For example, a liquid phase polymerization system, such as a slurry, suspension or solution reactor system may be used. In such a system, the reactor vessel typically contains a liquid reaction medium for dissolving and/or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Slurry or solution polymerization systems may utilize subatmospheric or superatmospheric pressures and temperatures in the range of about 40° C. to about 300° C. A useful liquid phase polymerization system is described in U.S. Pat. No. 3,324,095.

Reactive contact between the olefin monomer and the catalyst composition may be maintained by constant stirring or agitation, e.g., by a member such as a paddle or plunger rotating or moving through the reactor vessel (e.g., stirred reactor, blender, etc.). Other types of liquid phase polymerization systems can be formed by a rotating drum (e.g., with or without internal baffles to enhance mixing), a vessel moving in a see-saw manner, agitation including ultrasonic vibrations applied to the materials or vessel.

Polymerization conditions generally refer to temperature, pressure, monomer content (including comonomer concentration), catalyst concentration, cocatalyst concentration, activator concentration, etc., that influence the molecular weight of the polymer produced.

Raw Materials and Polymer Products

As used herein, the term "polymer" refers to a macromolecular compound prepared by polymerizing monomers of the same or a different type.

The polymer product(s) produced in the reactor can be or include any type of polymer or polymeric material. For example, the polymer product can include homopolymers of olefins (e.g., homopolymers of ethylene), and/or copolymers, terpolymers, and the like of olefins, particularly ethylene or propylene, and at least one other olefin. Illustrative polymers can include, but are not limited to, polyolefins, polyamides, polyesters, polycarbonates, polysulfones, polyacetals, polylactones, acrylonitrile-butadiene-styrene polymers, polyphenylene oxide, polyphenylene sulfide, styrene-acrylonitrile polymers, styrene maleic anhydride, polyimides, aromatic polyketones, or mixtures of two or more of the above. Suitable polyolefins can include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene and or butene.

Preferred polymers include homopolymers or copolymers of $C_2$ to $C_{40}$ olefins, preferably $C_2$ to $C_{20}$ olefins, preferably a copolymer of an alpha-olefin and another olefin or alpha-olefin (herein ethylene is defined to be an alpha-olefin). Preferably, the polymers can be or include homo polyethylene, homo polypropylene, propylene copolymerized with ethylene and or butene, ethylene copolymerized with one or more of propylene, butene or hexene, and optional dienes.

Preferred examples include thermoplastic polymers such as ultra low density polyethylene, very low density polyethylene ("VLDPE"), linear low density polyethylene ("LLDPE"), low density polyethylene ("LDPE"), medium density polyethylene ("MDPE"), high density polyethylene ("HDPE"), polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics. As used herein, the terms "monomer" and "comonomer" refers to any compound with a polymerizable moiety which is added to a reactor in order to produce a polymer. The term "polyolefin" refers to any polymer containing an olefinic monomer.

The polymers can be produced from monomers selected from ethylene, propylene, 1-butene, 1-hexene, 1-pentene, 4-methyl-1-pentene, 1-octene, 1-decene, vinyl-cyclohexene, styrene, ethylidene norbornene, norbornadiene, 1,3-butadiene, 1,5-hexadiene, 1,7-octadiene, 1,9-decadiene, or a combination thereof. The polymers can be homopolymers of ethylene or copolymers of ethylene with one or more $C_3$-$C_{20}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene copolymer preferably has at least one other alpha-olefin comonomer having at least four carbon atoms in an amount of at least 1 percent by weight of the polymer. Accordingly, ethylene/propylene copolymers are also contemplated.

EXAMPLES

To provide a better understanding of the foregoing discussion, the following non-limiting examples are provided. Although the examples are directed to specific embodiments, they are not to be viewed as limiting the invention in any specific respect. All parts, proportions and percentages are by weight unless otherwise indicated.

A series of pre-polymerization experiments using metallocene catalyst and monomers were performed in laboratory and pilot plant-scale slurry reactors. The experiments were generally performed at milder conditions (lower temperature and lower ethylene partial pressure) than those typically used in a polymerization process using the catalyst to produce high volumes of polymer product. The metallocene catalyst used in the experiments was a dimethylsilane bis(indenyl) zirconium dichloride catalyst supported on silica with a methylaluminoxane ("MAO") activator.

Figure 2:
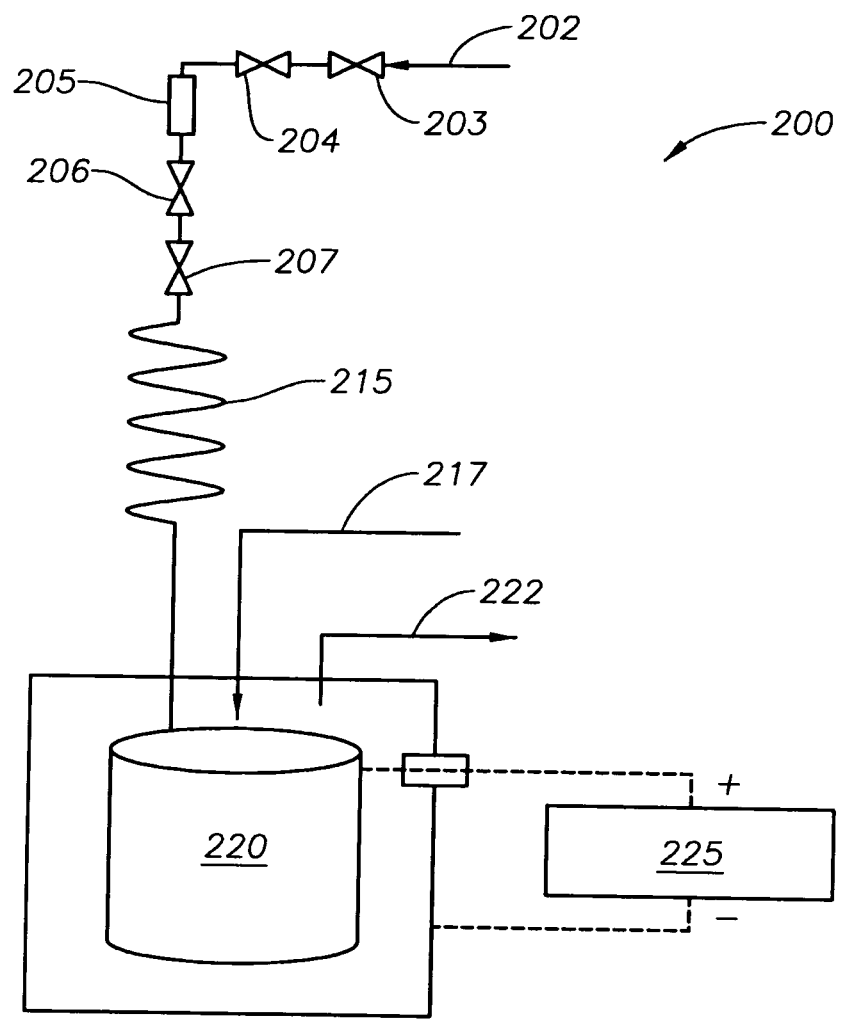
FIG. 2 is a schematic of an illustrative device for measuring the static charge of a material.

The test to measure static charge accumulation was performed using a measurement system 200, shown in FIG. 2. FIG. 2 depicts an illustrative measurement system 200 for measuring a static charge of a material. The measurement system 200 can include a catalyst spool or catalyst container 205, one or more valves (four are shown 203, 204, 206, 207), one or more coiled tubes 215, a Faraday ring or Faraday "can" 220, and one or more electrometers 225.

An inert gas, e.g. nitrogen, via line 202 can be introduced to the catalyst spool 205. As shown, valves 203 and 204 can be in fluid communication with line 202 to control the addition of the inert gas to the catalyst spool 205. The inert gas can be a high purity gas. For example, high purity nitrogen can include a gas containing about 99 mol %, about 99.9 mol %, about 99.99 mol %, about 99.999 mol %, or about 99.9999 mol % nitrogen. The valves 206, 207 can be controlled such that the inert gas can flush, urge, or otherwise cause catalyst, polymer, or pre-polymerized catalyst, or other material stored in the catalyst spool 205 to flow through the coiled tube 215 and into the Faraday can 220. For example, about 0.1 g of the material in the catalyst spool 205 can be flushed from the catalyst spool 205 and into the coiled tube 215. The coiled tube 215 can have a diameter of about 0.125 inches and a length of about 4 feet, for example.

The atmosphere or environment within the Faraday can 220 can be a high purity gas such as nitrogen. The high purity gas via lien 217 can be introduced to the Faraday can 220. Gas from within the Faraday can 220 can be vented via line 222. As such, a continuous flow of high purity gas via line 217 can be introduced to the Faraday can 220 and a continuous flow of gas can be vented via line 222. When the catalyst flows into and/or through the Faraday can 220 the electrometer 225 can measure the static charge on the material, e.g. the catalyst, pre-polymerized catalyst, polymer particles, or the like. Several measurements of the static charging developed on the particles were performed under nitrogen flow until no changes were observed. The readings on each sample were then averaged and the static charge was expressed as microcoulomb/gram (μC/g).

Example 1

In Example 1, a silica supported dimethylsilane bis(indenyl) zirconium dichloride catalyst with MAO treated with 1-3 wt % aluminum stearate ("MCN-1") was polymerized in the presence of ethylene monomer. The catalyst was pre-polymerized to achieve pre-polymer loadings of between about 3 gPE/g catalyst to about 10 gPE/g catalyst. The static charge on the pre-polymerized catalyst was then measured with the averaged results of duplicate static charging measurements on the catalyst and its pre-polymers made with and without 1-hexene in a laboratory slurry reactor shown in Table 2.

TABLE 2

| Charging Measurements on Example 1 Pre-polymerized Catalysts | | | | | | | | | | |
|---|---|---|---|---|---|---|---|---|---|---|
| Catalyst | MCN-1 | | Pre-Polymerized MCN-1 4:1 gPE/gCat Hexane slurry | | Pre-Polymerized MCN-1 9:1 gPE/gCat Hexane slurry | | Pre-Polymerized MCN-1 6:1:1 gPE/gCat w/hexane & Isobutane slurry | | Pre-Polymerized MCN-1 4.6:1 gPE/gCat w/H2 & Isobutane slurry | |
| Run | 1 | 2 | 1 | 2 | 1 | 2 | 1 | 2 | 1 | 2 |
| Constant Reading | 5.87 | 4.7 | 10.62 | 9.85 | 7.5 | 7.2 | 3.55 | 2.8 | 4.94 | 9.52 |
| 5 Seconds Continued Flow | 7.88 | 8.38 | 14.96 | 12.1 | 8.34 | 7.8 | 3.65 | 3.18 | 5.45 | 9.57 |
| 30 Seconds Continued Flow | 8.35 | 9.87 | 15.52 | 17.44 | 9.5 | 9.69 | 4.31 | 4.26 | 13.08 | 9.99 |

TABLE 2-continued

Charging Measurements on Example 1 Pre-polymerized Catalysts

| Catalyst | MCN-1 | Pre-Polymerized MCN-1 4:1 gPE/gCat Hexane slurry | Pre-Polymerized MCN-1 9:1 gPE/gCat Hexane slurry | Pre-Polymerized MCN-1 6:1:1 gPE/gCat w/hexane & Isobutane slurry | Pre-Polymerized MCN-1 4.6:1 gPE/gCat w/H2 & Isobutane slurry |
|---|---|---|---|---|---|
| Avg. Reading (Reading × Factor 0.018) | 9.11 | 16.48 | 9.65 | 4.285 | 11.54 |
| Charge ($\mu$C/g) | 0.32 | 0.2966 | 0.1737 | 0.077 | 0.2077 |

As seen in Table 2, the pre-polymer catalysts produced with just ethylene (homopolymers) had reduced charging compared with the bare catalyst. The addition of 1-hexene produced a further reduction in charging.

Example 2

A series of examples were conducted using a 10-gallon slurry reactor to prepare pre-polymers with MCN-1 under different conditions and with varying amounts of polymer on the catalyst. The pre-polymers were extracted from the reactor through a filter inertly. The conditions and results from the pre-polymerization reactions are shown in Table 3. The amount of pre-polymer formed was determined by ICP. The zirconium content of bare MCN-1 (catalyst that has not been pre-polymerized) was 0.334 wt %.

TABLE 3

Reactor Conditions for Making Slurry Pre-Polymer

| | Temp. (° C.) | $C_2$ Pressure (psi) | Catalyst (g) | Hexene (g) | $H_2$ (psi) | $C_2$ Consumed (g) | Yield (g) | PE/Cat (g/g) | Zr (wt %) |
|---|---|---|---|---|---|---|---|---|---|
| 2-A | 46 | 30 | 10 | 62 | 0 | 102 | 125 | 18 | 0.018 |
| 2-B | 47 | 35 | 10 | 60 | 0 | 72 | 149 | 17.5 | 0.019 |
| 2-C | 45 | 25 | 9.2 | 0 | 30 | 91 | 100 | 16.1 | 0.021 |

The static charge on the pre-polymerized catalyst was then measured. The averaged results of duplicate static charging measurements on bare MCN-1 catalyst and the three samples of pre-polymerized catalyst are shown in Table 4.

TABLE 4

Example 2 Pre-Polymer Charging Measurements

| | MCN-1 | | Pre-Polymer 2-A | | Pre-Polymer 2-B | | Pre-Polymer 2-C | |
|---|---|---|---|---|---|---|---|---|
| Run # | 1 | 2 | 1 | 2 | 1 | 2 | 1 | 2 |
| Constant Reading | 0.06 | 0.06 | 0.13 | 0.11 | 0.12 | 0.1 | 0.12 | 0.09 |
| 6 sec. Continued Flow | 8.5 | 10.67 | 5.14 | 3.12 | 2.65 | 1.69 | 1.13 | 0.5 |
| 30 sec. Continued Flow | 22.73 | 23.36 | 6.49 | 5.34 | 2.67 | 4.26 | 1.47 | 2.3 |
| Average Reading (Reading × Factor 0.018) | 23.05 | | 5.92 | | 3.46 | | 1.88 | |
| Charge ($\mu$C/g) | 0.4149 | | 0.1066 | | 0.0623 | | 0.0338 | |

As shown in Table 4, all three pre-polymerized catalysts have considerably lower charge (0.03 to 0.10 $\mu$C/g) than the bare MCN-1 catalyst. The results suggest that pre-polymerized MCN-1 catalysts may offer a considerable improvement in reactor operability and that the lower charging of these pre-polymerized catalysts may enable the operation of MCN-1 without the use of continuity aids. It is expected that similar results (static-charge reduction) could be obtained from the pre-activation of other metallocene catalysts and other silica, alumina, silica-alumina, and other inorganic oxide supported metallocene systems as well.

The pre-polymerized catalysts (2-A, 2-B, and 2-C) were then polymerized further in lab scale gas-phase reactor. Table 5 shows the polymerization reactor conditions and the resulting productivity and activity of the pre-polymerized catalysts. As seen in Table 5, the gas-phase polymerizations of the first two runs were relatively active and similar to the each other; however, the third run was less active.

TABLE 5

Results of Gas-Phase Reactor Polymerization with Catalyst Pre-Polymers

| Run | Pre-Polymer | Temp. (° C.) | Pre-Poly (g) | pC$_2$ (psi) | C$_6$/C$_2$ | H$_2$/C$_2$ | Yield (g) | Productivity gPE/gCat | Activity gPE/gCat/hr |
|---|---|---|---|---|---|---|---|---|---|
| 1 | 2-A | 85 | 0.6435 | 165 | 0.013 | 0.0012 | 25.4 | 450 | 450 |
| 2 | 2-B | 85 | 0.688 | 165 | 0.014 | 0.0012 | 28 | 566 | 566 |
| 3 | 2-C | 85 | 0.645 | 163 | 0.015 | 0.0012 | 19 | 295 | 295 |

A separate series of charging measurements was performed on the polyethylene resins made by the further polymerization of the above pre-polymers. The results of the charging measurements are shown in Table 6. The polymers made with the pre-polymers containing 1-hexene showed static charging similar to that of polymers prepared with the non-pre-polymerized MCN-2. The polymer resulting from the use of the Pre-Polymer 2-C, which was made in the presence of H2, showed a higher level of charging.

TABLE 6

Charging Measurements on Polymers Made with Pre-Polymerized MCN-1

| Catalyst | MCN-1 | | Pre-Polymer 2-A | | Pre-Polymer 2-B | | Pre-Polymer 2-C | |
|---|---|---|---|---|---|---|---|---|
| Run # | 1 | 2 | 1 | 2 | 1 | 2 | 1 | 2 |
| Constant Reading | 0.08 | 0.08 | 0.18 | 0.09 | 0.08 | 0.08 | 0.33 | 0.23 |
| 6 sec. Continued Flow | 0.11 | 0.37 | 0.43 | 0.13 | 0.12 | 0.22 | 0.76 | 0.51 |
| 30 sec. Continued Flow | 0.15 | 0.38 | 0.43 | 0.21 | 0.14 | 0.24 | 1.09 | 0.85 |
| Average Reading (Reading × Factor 0.018) | 0.2625 | | 0.32 | | 0.19 | | 0.97 | |
| Charge/Gram (µC/g) | 0.0039 | | 0.0058 | | 0.0034 | | 0.175 | |

An aging study was conducted with the pre-polymers. Three samples of MCN-1 pre-polymers were further polymerized in a 1 liter lab autoclave reactor. All the pre-polymers were handled in a dry box under inert atmosphere in order to preserve the catalyst activity. Polymerizations were performed in a 600 cc iso-butane slurry at 85° C., at pC2=125 psi, with 20 ml of 1-hexene, 0.2 mmol of TIBA used as a scavenger and a run length of 40 min. In Table 7 are results of the freshly prepared pre-polymers and of subsequent polymerizations performed under the same conditions at regular intervals for about four weeks.

TABLE 7

Lab Slurry Reactor Polymerizations with MCN-1 Pre-Polymers

| | Catalyst Used | Catalyst (g) | Yield (g) | Productivity gPE/gCat/h | MI | FI | MFR | BD (lb/cf) | Time days | Activity Loss % |
|---|---|---|---|---|---|---|---|---|---|---|
| 1 | MCN-1 | 0.1046 | 69 | 989 | 0.37 | 17.3 | 47.0 | 28.4 | — | — |
| 2 | 2-A | 0.1132 | 91 | 1206 | 0.12 | 6.90 | 59.6 | 36.6 | 0 | — |
| 3 | 2-A | 0.1037 | 58 | 839 | 0.43 | 17.4 | 40.2 | 28.7 | 14 | 38 |
| 4 | 2-A | 0.1155 | 21 | 367 | — | — | — | — | 41 | 69.5 |
| 5 | 2-B | 0.1159 | 66 | 934 | 0.80 | 35.6 | 44.3 | 37.4 | 1 | — |
| 6 | 2-B | 0.1076 | 63 | 860 | 0.19 | 10.0 | 52.0 | 34.4 | 13 | 3.0 |
| 7 | 2-B | 0.1145 | 21 | 332 | 1.04 | 41.2 | 39.6 | 50.9 | 35 | 50.9 |
| 8 | 2-C | 0.1234 | 85 | 1033 | 0.12 | 7.5 | 64.3 | 37.4 | 4 | — |
| 9 | 2-C | 0.1247 | 76 | 913 | 0.13 | 6.7 | 50.4 | 32.9 | 12 | 16.5 |
| 10 | 2-C | 0.1274 | 25 | 392 | 0.23 | 11.4 | 49.6 | 33.0 | 33 | 62.0 |

As seen in Table 7, good activity was observed for all pre-polymers compared to the standard catalyst that was used as a control. No significant changes on MFR of the polymer resulting from the polymerization reaction was observed as a result of using the pre-polymerized catalyst. The pre-polymerized catalyst seemed to have a greater impact on the polymer bulk density. Loss of activity to a variable extent was observed for the three MCN-1 pre-polymers along a time span of about 4 weeks. However, after such a time period, the three pre-polymers performed similarly regardless of their previous activities.

Examples 3 and 4

The polymerization reactions described in the following examples were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

The catalyst feed rate was adjusted to maintain a constant production rate of polymer. The reacting bed of growing polymer particles was maintained in a fluidized state by the continuous flow of the make up feed and recycle gas through the reaction zone. A superficial gas velocity of about 0.6 m/s to about 0.9 m/s was used to achieve this. The reactor was operated at a total pressure of 2,240 kPa. The reactor was operated at a constant reaction temperature of 85° C.

The fluidized bed was maintained at a constant height by withdrawing a portion of the bed at a rate equal to the rate of formation of particulate product. The rate of product formation (the polymer production rate) was in the range of about 15 kg/hr to about 25 kg/hr. The product was removed semi-continuously via a series of valves into a fixed volume chamber. This product was purged to remove entrained hydrocarbons and treated with a small steam of humidified nitrogen to deactivate any trace quantities of residual catalyst.

Continuity additives used in Example 3 include: aluminum distearate and an ethoxylated amine type compound (IRG-ASTAT AS-990).

Example 3

Comparative Example

A test was carried out in the above mentioned polymerization reactor using a conventional dimethylsilane bis(indenyl) zirconium dichloride catalyst supported on silica with a methylaluminoxane ("MAO") activator. 2 wt % AS-990 and 3 wt % aluminum di-stearate as a continuity additive were added to the conventional catalyst as a continuity additive. The reactor was operated to produce a polymer product having a melt index ($I_2$) of about 0.76 g/10 min and a density of about 0.9205 g/cm$^3$ at the following reaction conditions: temperature of 85° C., hexene-to-ethylene molar ratio of 0.0094 and $H_2$ to ethylene concentration of 13 (ppm $H_2$/mol % ethylene). The melt index ($I_2$) was measured in accordance with ASTM D-1238-E (at 190° C., 2.16 kg weight).

Initially, the reactor was operating smoothly under the above conditions using the above catalyst with an additional continuity additive co-fed to the reactor. This additional continuity additive consisted of aluminum distearate slurried in mineral oil and was fed to the reactor separate from the catalyst. The level of this continuity additive was about 18.25 ppmw based on polymer production rate. Use of continuity additive blended with the catalyst and additional co-feed of continuity additive is needed for reactor operation without sheeting.

Example 4

Another test was carried out in the above mentioned polymerization reactor using a pre-polymerized dimethylsilane bis(indenyl) zirconium dichloride catalyst supported on silica with a methylaluminoxane ("MAO") activator. The pre-polymerized catalyst was prepared without any continuity additive added thereto. The pre-polymerized catalyst was prepared in a 10 gallon agitated vessel having a jacket for temperature control. About 13.5 kg of hexane, 20 g of hexene, and 70 g of 10 wt % solution of triisobutylaluminum (TIBA) in toluene were added to the vessel at ambient temperature and mixed for about 30 minutes while the jacket was heated to approximately 40° C. The hexane was dried to less than 30 ppm $H_2O$ by circulation through molecular sieves and the hexene was purified by circulation through alumina prior to introduction to the vessel.

Approximately 100 g of catalyst was introduced into the vessel and approximately 100 grams of hexane was used to flush the catalyst introduction port in order to ensure all the catalyst was introduced to the vessel. The vessel was then pressured to approximately 20 psig with ethylene. Ethylene was then further introduced as needed to maintain a pressure of about 20 psig to about 25 psig within the vessel. Prior to introducing the ethylene to the vessel, the ethylene was passed through molecular sieves and a deoxo bed.

When the pre-polymerization started the jacket temperature was used to control the temperature to between 43° C. and 47° C. An additional 500 grams of ethylene, beyond that used for the initial pressure build was introduced to the vessel. The amount of ethylene fed to the vessel is limited to the amount of polymer that will fit into a filter that is used to collect the final product at the end of the process. The pre-polymerization was carried out for about 4 hours. At the completion of the pre-polymerization, the jacket was cooled to 20° C., thereby cooling the formed pre-polymerized catalyst; and unreacted ethylene was then vented off. The vessel was then purged three times with nitrogen from 0 psig to about 40 psig in order to remove ethylene dissolved in the hexane.

A pre-polymerized catalyst and hexane mixture remained in the vessel, which was then discharged into a bag filter to collect the pre-polymerized catalyst, with the filtrate hexane collected as a waste stream. A hexane rinse was passed through the vessel and into the filter to remove loose powder from the walls of the vessel and agitator. The bag filter was purged over night (for convenience) with nitrogen to remove residual hexane. Dry pre-polymerized catalyst was recovered the next day by opening the filter in a glove box and removing the catalyst from the filter bag. The total weight of the pre-polymerized catalyst was about 600 g.

A test was carried out in the above mentioned polymerization reactor under similar conditions as mentioned in Example 3 above. Initially, the reactor was operated using the same catalyst as in Example 3, which contained the continuity additives blended with the catalyst as well as additional continuity additive co-feed. The reactor was then transitioned to operation using the pre-polymerized catalyst prepared without any continuity additive blended with the catalyst and was subjected to pre-polymerization as discussed and described above.

Initially, the reactor was operated with this pre-polymerized catalyst while still co-feeding continuity additive at 18 ppm level (based on polymer production rate). Continuity additive co-feed was stopped after operating for 14 hours with this pre-polymerized catalyst. Reactor operation remained smooth with no sheeting to produce a polymer product having a melt index ($I_2$) of about 0.8 g/10 min and a density of about 0.9172 g/cm$^3$ at the following reaction conditions: temperature of 85° C., hexene-to-ethylene molar ratio of 0.0095 and $H_2$ to ethylene concentration of 11.8 (ppm $H_2$/mol % ethylene). The reactor was operated smoothly with this pre-polymerized catalyst until the end of the test that lasted for 44 hours.

TABLE 8

Summary of reaction conditions utilized in both Examples 3 and 4.

| Example | 3 | 4 |
| --- | --- | --- |
| Catalyst | Conventional Catalyst | Pre-Polymerized Catalyst |
| Residence Time (hrs) | 2.40 | 3.00 |
| $C_2$ Partial Pressure (psia) | 210.1 | 210.3 |
| $H_2/C_2$ (ppm/mol %) | 13.0 | 11.8 |
| $C_6/C_2$ Concentration Ratio (mole/mole) | 0.0094 | 0.0095 |
| Reactor Pressure (psig) | 346.1 | 345.9 |

TABLE 8-continued

Summary of reaction conditions utilized in both Examples 3 and 4.

| Example | 3 | 4 |
|---|---|---|
| Reaction Temperature (° C.) | 85.00 | 85.00 |
| Gas Velocity (ft/sec) | 2.03 | 2.01 |
| Continuity Additive Name | Al distearate | None |
| Continuity Additive Concentration (ppmw) | 18.25 | 0.00 |
| Melt Index (g/10 min) | 0.76 | 0.80 |
| Density (g/cm$^3$) | 0.9205 | 0.9172 |
| Bulk Density (lb/ft$^3$) | 29.83 | 30.24 |
| Screen APS (in) | 0.034 | 0.052 |

Surprisingly and unexpectedly gas-phase fluidized bed polymerization substantially free of any continuity additives was carried without the formation of lumps, chunks, sheets, or the like within the reactor. As such, the pre-polymerized catalyst can be used in gas phase fluidized bed reactors for the polymerization of monomer(s) without the need for any continuity additive to be blended with the catalyst and/or co-fed separately to the reactor.

Also, the pre-polymerized catalyst produced polymer particles having improved morphology. The polymer particles produced using the pre-polymerized catalyst had a more uniform and larger particle size distribution as compared to the polymer produced using the convention catalyst.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for gas phase olefin polymerization, comprising:

injecting a pre-polymerized supported metallocene catalyst into a fluidized bed polymerization reactor system at the start-up of the reactor system, wherein the catalyst has a charge of less than about 0.3 µC/g;

contacting a monomer with the pre-polymerized metallocene catalyst;

operating the reactor at conditions sufficient to produce a polyolefin;

wherein one or more continuity additives is added to the reactor system during the initial start-up of the reactor;

wherein the introduction of one or more continuity additives to reactor system is stopped after a period of time has elapsed from reactor start-up, such that after stopping the introduction of the one or more continuity additives the polymerization is continued in the substantial absence of the one or more continuity additives.

2. The method of claim 1, further comprising, after start-up, discontinuing injection of the catalyst into the reactor system, and injecting a different catalyst into the reactor system.

3. The method of claim 1, wherein "substantial absence" means that the total concentration of any continuity additives, if present, is less than 5 ppmw based on the rate of polyolefin production.

4. The method of claim 1, wherein the period of time that has elapsed from reactor start-up is less than about 2 hours.

5. The method of claim 1, wherein the period of time that has elapsed from reactor start-up is less than about 20 hours.

6. The method of claim 1, wherein polymerization is continued in the substantial absence of continuity additives for at least 5 hours.

7. The method of claim 1, wherein no detectable amount of polymer agglomeration is formed during operation of the reactor.

8. The method of claim 1, wherein the monomer is ethylene.

9. The method of claim 1, wherein the catalyst is also contacted with a comonomer comprising one or more $C_3$ to $C_{12}$ olefins.

10. The method of claim 9, wherein the comonomer is a hexene.

11. The method of claim 1, wherein the pre-polymerized catalyst has coupled thereto the same polymer as the polymer created with the catalyst in a fluidized bed polymerization reactor system.

12. The method of claim 1, wherein the metallocene catalyst has the formula:

$$Cp^A Cp^B MX_n \text{ or } Cp^A(A)Cp^B MX_n,$$

wherein M is a Group 4, 5 or 6 atom; $Cp^A$ and $Cp^B$ are each bound to M and are independently selected from the group consisting of cyclopentadienyl ligands, substituted cyclopentadienyl ligands, ligands isolobal to cyclopentadienyl and substituted ligands isolobal to cyclopentadienyl; (A) is a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbyls, wherein the heteroatom containing hydrocarbyls comprise from one to three heteroatoms; X is a leaving group selected from the group consisting of chloride ions, bromide ions, $C_1$ to $C_{10}$ alkyls, and $C_2$ to $C_{12}$ alkenyls, carboxylates, acetylacetonates, and alkoxides; and n is an integer from 1 to 3.

* * * * *